US008381533B2

(12) United States Patent
Smoke et al.

(10) Patent No.: US 8,381,533 B2
(45) Date of Patent: Feb. 26, 2013

(54) DIRECT TRANSFER AXIAL TANGENTIAL ONBOARD INJECTOR SYSTEM (TOBI) WITH SELF-SUPPORTING SEAL PLATE

(75) Inventors: Jason Smoke, Phoenix, AZ (US); Bob Mitlin, Scottsdale, AZ (US); Alexander MirzaMoghadam, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 639 days.

(21) Appl. No.: 12/433,634

(22) Filed: Apr. 30, 2009

(65) Prior Publication Data
US 2010/0275612 A1 Nov. 4, 2010

(51) Int. Cl.
*F02C 7/18* (2006.01)
*F01D 5/00* (2006.01)
(52) U.S. Cl. .......................... 60/806; 415/115
(58) Field of Classification Search .............. 60/805, 60/806; 415/115
See application file for complete search history.

(56) References Cited

U.S. PATENT DOCUMENTS

| | | | | |
|---|---|---|---|---|
| 3,989,410 A | * | 11/1976 | Ferrari | 415/115 |
| 4,178,129 A | * | 12/1979 | Jenkinson | 416/95 |
| 4,759,688 A | * | 7/1988 | Wright et al. | 416/95 |
| 4,822,244 A | * | 4/1989 | Maier et al. | 415/115 |
| 4,872,810 A | * | 10/1989 | Brown et al. | 416/145 |
| 5,310,319 A | | 5/1994 | Grant et al. | |
| 5,403,156 A | | 4/1995 | Arness et al. | |
| 5,440,874 A | * | 8/1995 | Charier et al. | 60/806 |
| 6,050,079 A | | 4/2000 | Durgin et al. | |
| 6,196,791 B1 | | 3/2001 | Tomita et al. | |
| 6,945,749 B2 | * | 9/2005 | De Cardenas | 415/115 |
| 6,981,841 B2 | | 1/2006 | Krammer et al. | |
| 2006/0285968 A1 | | 12/2006 | Riahi et al. | |

FOREIGN PATENT DOCUMENTS

EP 1676977 * 12/2004

* cited by examiner

*Primary Examiner* — Ted Kim
(74) *Attorney, Agent, or Firm* — Ingrassia Fisher & Lorenz, P.C.

(57) ABSTRACT

An apparatus for cooling turbine blades in a turbine engine including a direct transfer axial tangential onboard injector (TOBI) for a turbine rotor and a self-supporting seal plate disposed on a rotating disk for the turbine engine. The TOBI includes a plurality of openings emanating a flow of cooling air. The self-supporting seal plate comprises a plurality of shaped cooling holes in fluid communication with the flow of cooling air emanating from the TOBI. The rotating disk includes a plurality of turbine blade slots formed therein. The plurality of cooling holes are in fluid communication with the plurality of turbine blade slots for directing the flow of cooling air to provide cooling to the plurality of turbine blades. The plurality of openings, the plurality of cooling holes and the plurality of turbine blade slots are in axial alignment and optimized to minimize radial and hoop stresses.

18 Claims, 4 Drawing Sheets

DIRECT TRANSFER AXIAL TANGENTIAL ONBOARD INJECTOR SYSTEM (TOBI) WITH SELF-SUPPORTING SEAL PLATE

STATEMENT REGARDING FEDERALLY SPONSORED RESEARCH OR DEVELOPMENT

This invention was made with Government support under W911W6-08-2-0001 awarded by U.S. Army. The Government has certain rights in this invention.

TECHNICAL FIELD

The present invention generally relates to an apparatus for providing a cooling flow to a high pressure turbine rotor. More specifically, the present invention relates to an apparatus relating to providing a cooling flow to a turbine rotor by controlling the alignment and geometry of a plurality of cooling holes formed in the engine assembly and a cooperating seal plate.

BACKGROUND

Turbine engines may include a compressor section, wherein inlet air is compressed, followed by a combustor section wherein fuel is combusted with the compressed air to generate exhaust gas. The exhaust gas is then directed to a turbine section, wherein energy is extracted from the exhaust gas.

The turbine section may comprise a rotor assembly. The rotor assembly may include a plurality of turbine blades installed on a rotatable disk. During operation, the turbine blades, the rotating disk, and other components of the turbine section may be exposed to elevated gas path temperatures, and thus may require cooling. Cooling may be provided to turbine section components using cooling air extracted from other parts of the engine via ducts in stationary and/or rotating components. For example, cooling air may be supplied from the combustor plenum. When the cooling air comes onboard the turbine rotor energy losses may occur resulting in a drop in pressure and a temperature increase. To minimize these effects, the static-to-rotating transition is typically accomplished using a stationary Tangential OnBoard Injector (TOBI).

A typical TOBI has a series of circumferentially spaced nozzle orifices which accelerate and direct the cooling air via a plurality of openings such that its tangential speed matches or exceeds that of the rotating components at the radius where the flow is being introduced. This speed matching approach typically reduces aerodynamic losses. A plurality of cooling holes serves as an inlet for cooling air in fluid communication with the turbine blade feed system. A portion of the cooling air leaving the TOBI openings traverses the distance between the TOBI exit and enters the plurality of cooling holes, which ultimately provides cooling to the turbine blades.

The cooling effectiveness of the blade is a strong function of the amount of cooling air, temperature of the cooling air, and the pressure level at which the cooling air is supplied to the blade. Increased flow rates of cooling airflow combined with elevated coolant supply pressure can be used to improve blade cooling effectiveness. The greater the cooling air flow, the cooler the turbine blade. However, gas turbine engines must be designed such that the use of secondary airflow is minimized, as that secondary cooling flow is diverted from the main core flow and does not do any actual work in the upstream turbine stages where it is dumped. Similarly, colder cooling air will more effectively cool the turbine blades. Accordingly, the preferable approach to cooling turbine blades is to use colder air, but less of it. The challenge lies in transferring the air from the static structure to the rotating components while minimizing the pressure drop and temperature increase.

In general, there are two types of TOBI configurations employed in gas turbine engines: radial and axial. In a radial TOBI, a cooling air flow comes onboard the turbine rotor at a low radius, and is then pumped to a higher radius where the blade slot bottom resides. A radial TOBI is the simpler and less expensive type of TOBI to manufacture, as well as the easiest to seal against leakage. Due to the inherent lower disk cavity pressures at low radii, the radial TOBI can achieve a higher pressure drop (i.e. higher swirl ratio) leading to a lower exit relative temperature. A primary weakness with the radial TOBI is that by pumping the cooling air to a higher radius where the blade slot bottom resides, as in a centrifugal compressor, the temperature of the air is raised significantly and the swirl ratio is lowered by the time it reaches the blade. A positive aspect of this type of TOBI configuration is that much of the pre-TOBI pressure is recovered.

In an axial TOBI configuration, the cooling air is introduced to the rotor at a higher radius to avoid heat gain and work extraction. In that there is no pressure recovery, the maximum TOBI swirl ratio is limited and leakages are higher. However, because there is no temperature increase, the overall turbine stage and cycle efficiency is better than in a radial TOBI.

Many small turbine engines, which spin in the 30,000 to 50,000+ RPM range, use axial TOBI setups at low radius where the cooling air passes through holes in a turbine rotor forward seal plate in order to reach the blade slot bottom at higher radius. This is necessary due to the high rotational speeds and high disk stresses. In this type of configuration, the rotor seal plates must be self-supporting and thus mandates that the engine have a low radius hub to carry the centrifugal load and have sufficient stress rupture life and burst margin. Larger, slower turning engines may employ a direct transfer TOBI at a higher radius where there is no need for a rotor seal plate. A direct transfer TOBI is the most favorable configuration in terms of minimizing secondary cooling flow and maximizing turbine efficiency, however this type of configuration is not feasible for small, high-performance turbines due to the inherent high rotor stresses precluding rotor holes feeding the blade slots.

Hence, there is a need for an apparatus including a direct transfer axial TOBI configuration for small turbine engines employing a rotor seal plate that provides for maximum temperature reduction with minimum pressure drop. In addition there is a need for a direct transfer axial TOBI configuration that does not adversely impact gas turbine engine efficiency, and/or does not adversely impact overall operational efficiency and cost. The present invention addresses one or more of these needs.

BRIEF SUMMARY

The present invention provides an apparatus including a direct transfer tangential onboard injector system with a self-supporting seal plate.

In one embodiment, and by way of example only, there is provided an apparatus including a tangential onboard injector (TOBI) for a turbine rotor having a plurality of openings emanating a flow of cooling air; a self-supporting seal plate having a plurality of cooling holes in fluid communication with the flow of cooling air emanating from the tangential onboard injector (TOBI); and a rotating disk of a gas turbine engine including a plurality of turbine blade slots formed therein, wherein the self-supporting seal plate is disposed on the rotating disk. The plurality of cooling holes are in fluid communication with the plurality of turbine blade slots for directing the flow of cooling air to provide cooling to a plurality of turbine blades of the gas turbine engine. The plurality of openings, the plurality of cooling holes and the plurality of turbine blade slots are in axial alignment.

In another exemplary embodiment, and by way of example only, there is provided an apparatus including a direct transfer axial tangential onboard injector (TOBI) for a turbine rotor having a plurality of openings emanating a flow of cooling air; a self-supporting seal plate including a plurality of elongated shaped cooling holes in fluid communication with the flow of cooling air emanating from the direct transfer axial tangential onboard injector (TOBI); and a rotating disk of a gas turbine engine including a plurality of turbine blade slots formed therein, wherein the self-supporting seal plate is disposed on the rotating disk. The plurality of elongated shaped cooling holes are in fluid communication with the plurality of turbine blade slots for directing the flow of cooling air to provide cooling to a plurality of turbine blades of the gas turbine engine. The plurality of openings, the plurality of elongated shaped cooling holes and the plurality of turbine blade slots are in axial alignment. In addition, each of the plurality of elongated shaped cooling holes has a substantially elliptical geometry.

In yet another exemplary embodiment, and by way of example only, there is provided a gas turbine engine including a compressor section; a combustor section; and a turbine section. The turbine section including a tangential onboard injector (TOBI) for a turbine rotor having a plurality of openings emanating a flow of cooling air; a self-supporting seal plate having a plurality of cooling holes in fluid communication with the flow of cooling air emanating from the tangential onboard injector (TOBI); and a rotating disk including a plurality of turbine blade slots formed therein, wherein the self-supporting seal plate is disposed on the rotating disk. The plurality of cooling holes are in fluid communication with the plurality of turbine blade slots for directing the flow of cooling air to provide cooling to a plurality of turbine blades of the gas turbine engine. The plurality of openings, the plurality of cooling holes and the plurality of turbine blade slots are in axial alignment.

Other independent features and advantages of the apparatus will become apparent from the following detailed description, taken in conjunction with the accompanying drawings which illustrate, by way of example, the principles of the invention.

BRIEF DESCRIPTION OF THE DRAWINGS

The present invention will hereinafter be described in conjunction with the following drawing figure, wherein.

DETAILED DESCRIPTION

Before proceeding with the description, it is to be appreciated that the following detailed description is merely exemplary in nature and is not intended to limit the invention or the application and uses of the invention. Furthermore, there is no intention to be bound by any theory presented in the preceding background or the following detailed description.

The embodiment disclosed herein is described in sufficient detail to enable those skilled in the art to practice the invention, and it is to be understood that other embodiments may be utilized and that logical mechanical changes may be made without departing from the scope of the present invention. Furthermore, it will be understood by one of skilled in the art that although the specific embodiment illustrated below is directed at the cooling of turbine blades point which is diametrically opposite another point on a sphere of a gas turbine engine in an aircraft, for purposes of explanation, the apparatus may be used in various other embodiments employing turbine blades typically found in gas turbine engines. The following detailed description is, therefore, not to be taken in a limiting sense.

Broadly, the present invention generally provides a cooling apparatus including a direct transfer axial tangential onboard injector (TOBI) with a self-supporting seal plate for use in a gas turbine engine, useful in commercial or military aircraft, including fixed wing aircraft, rotorcraft, and the like. The direct transfer axial TOBI and seal plate assembly may comprise a plurality of cooling holes; wherein alignment of the seal plate with the disk and the geometry of the cooling holes and the self-supporting seal plate provide for maximum temperature reduction with minimum pressure drop. The present invention also provides a method for controlling cooling flow to a high-pressure turbine rotor via the TOBI and seal plate assembly, wherein the radial and hoop stresses generated by the turbine blades can be controlled, without compromising the turbine's durability and integrity.

Figure 1:
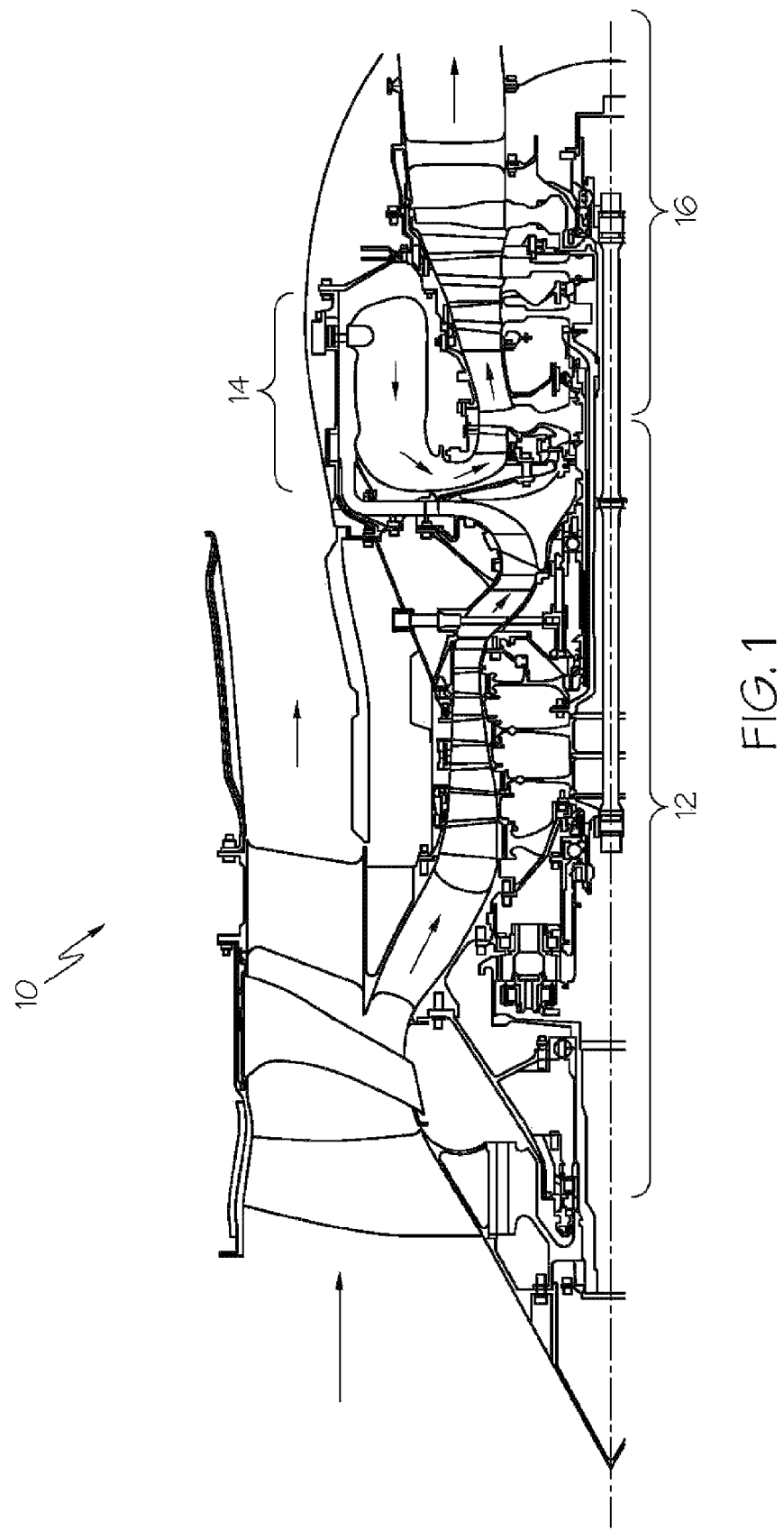
FIG. 1 is a partial cross-sectional view of a gas turbine engine according to an embodiment of the present invention.
Figure 2:
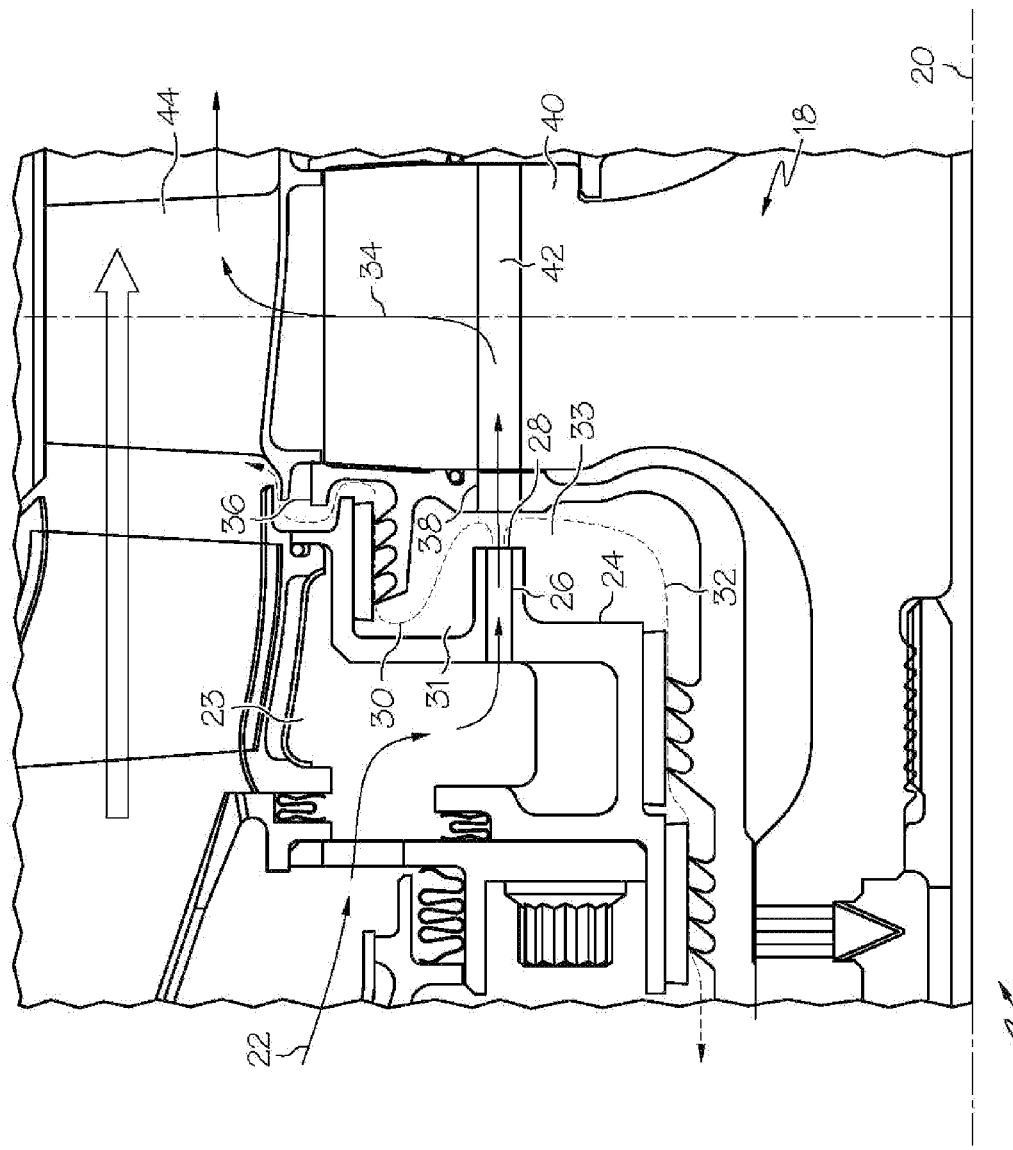
FIG. 2 is a cross-sectional view of a rotor assembly of a gas turbine engine according to an embodiment of the present invention.

As shown in FIG. 1, an embodiment of the present invention may include a gas turbine engine 10 comprising a compressor section 12, a combustor section 14, and a turbine section 16. As shown in FIG. 2, which depicts a portion of the turbine section 16 of an embodiment of the present invention, the turbine section 16 may comprise a turbine rotor assembly 18 capable of rotation about a central axis 20. A cooling air 22 typically produced in a combustion plenum of the gas turbine engine 10 may be bled from the compressor section 12 and passed through a TOBI inlet cavity 23 and a direct transfer axial TOBI 24 via a plurality of openings 26. A split in the cooling air 22 may occur at an exit 28 of the direct transfer axial TOBI 24. A portion of the cooling air 22 may be split into a purge air 30, which may be provided to purge a disk cavity 31 and a TOBI outlet inflow 32 to a cavity 33. Another portion of the cooling air 22 may be split into a blade cooling air 34 and then passed through a plurality of openings, in a self-supporting seal plate 36 referred to herein as cooling holes 38. The plurality of cooling holes 38 are thus disposed through the self-supporting seal plate 36 which is located upstream from and affixed to a disk 40. The blade cooling air 34 may then be directed into one or more blade slots 42 to provide cooling of a turbine blade 44. The self-supporting seal plate 36 ensures that a portion of the cooling air 22 is directed towards the turbine blade 44, and is not leaked out into a gas-path upstream of the turbine blade 44.

In this preferred embodiment, the exit 28 of the direct transfer axial TOBI 24, and more particularly each of the plurality of openings 26, is in axial alignment with each of the plurality of cooling holes 38 formed in the self-supporting seal plate 36. In addition, the seal-supporting seal plate 36 is positioned in a line-to-line, or axial abutting relationship with the disk 40 and more particularly, the plurality of blade slots 42 formed therein. The shape of the plurality of cooling holes 38 formed in the self-supporting seal plate 36 are optimized as described herein to provide for the reduction of stresses, including hoop and radial stresses, caused by this inline and abutting relationship.

Figure 4:
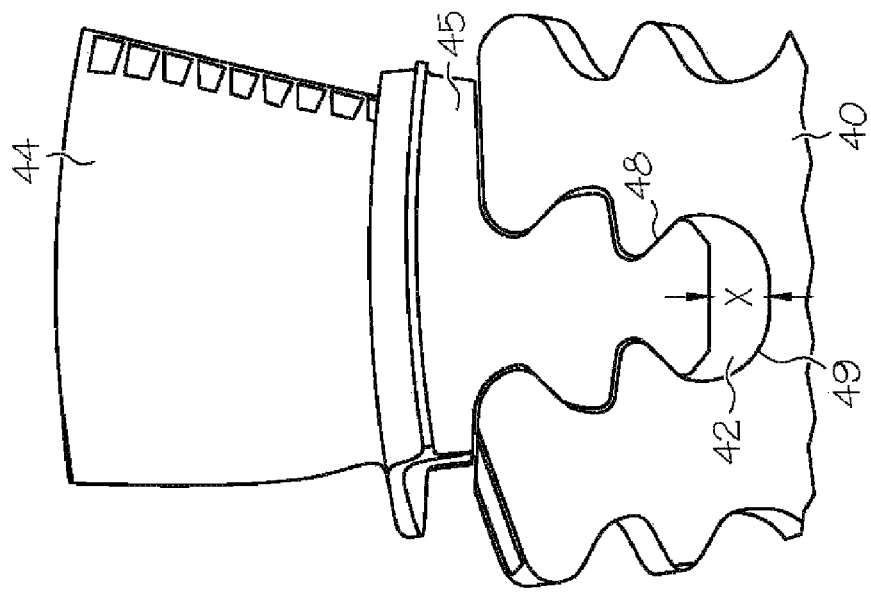
FIG. 4 is a perspective view of a portion of the disk and blade assembly illustrated in FIG. 3. according to an embodiment of the present invention.
Figure 3:
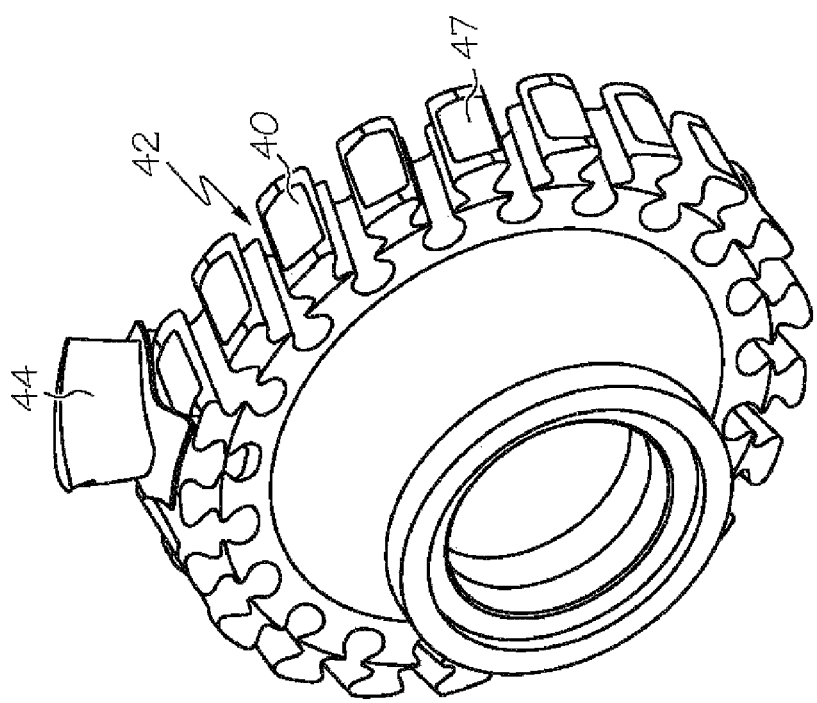
FIG. 3 is a perspective view of a disk and blade assembly according to an embodiment of the present invention.

Referring now to FIGS. 3 and 4, illustrated is a perspective view of a disk and blade assembly of the present invention and an enlargement of a portion of the disk and blade assembly. As best illustrated in FIG. 3, the disk 40 has formed about a periphery 47 the plurality of blade slots 42. Each of the plurality of blade slots 42 has positioned therein one of a plurality of turbine blades, of which only one turbine blade 44 is illustrated. As best illustrated in FIG. 4, each of the plurality of blade slots 42, of which only one is shown in an enlarged view, includes an upper portion 48 and a lower portion 49 having a radius "x". The turbine blade 44, and more particularly a root portion 45 of the turbine blade 44, resides substantially within the upper portion 48 of each of the plurality of blade slots 42. As previously described, the seal-supporting seal plate 36 is positioned in a line-to-line, or axial abutting relationship with the disk 40. The plurality of cooling holes 38 of the self-supporting seal plate 36 are positioned having a radius in line with the lower portion 49, and more particularly the radius "x" of each of the plurality of blade slots 42. The cooling air 22 passes through this lower portion 49 of each of the plurality of blade slots 42, thereby providing cooling to the turbine blades 44.

Figure 6:
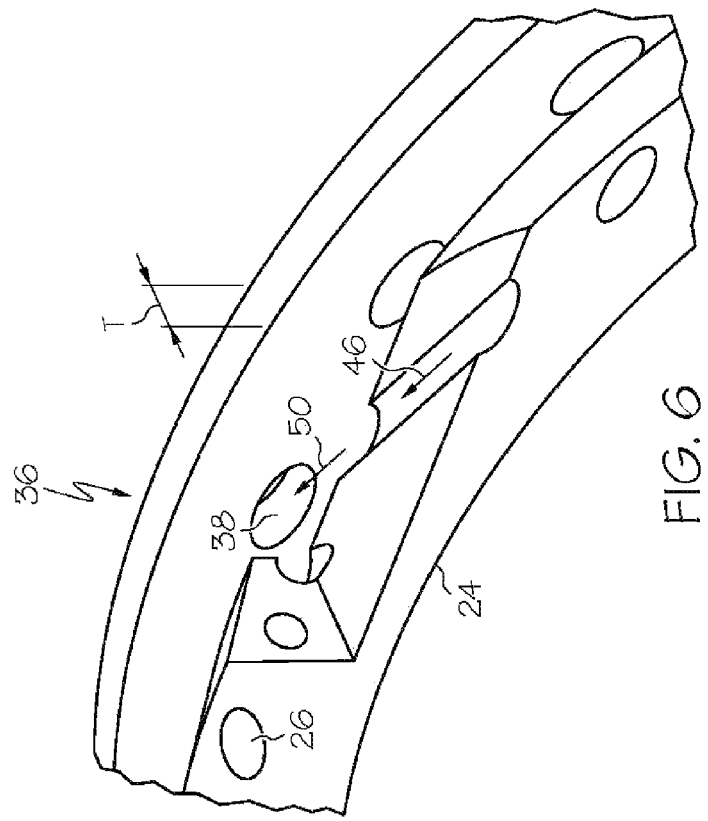
FIG. 6 is a perspective view of portion of the TOBI and rotor seal plate assembly illustrated in FIG. 5 according to an embodiment of the present invention.
Figure 5:
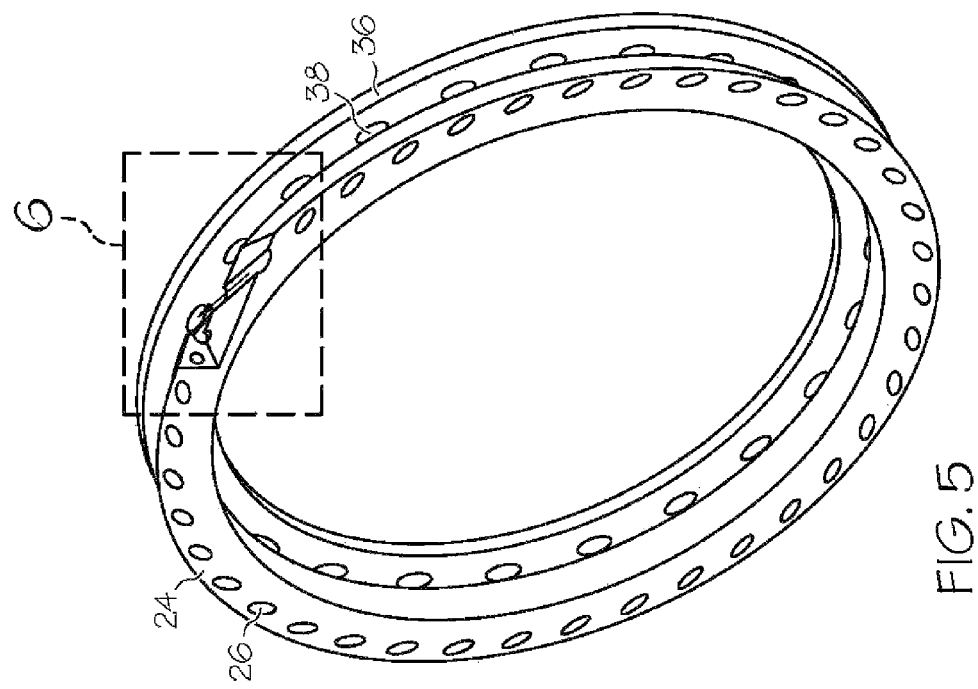
FIG. 5 is a perspective view of a TOBI and rotor seal plate assembly according to an embodiment of the present invention.

Referring now to FIGS. 5 and 6, illustrated in perspective views is a preferred embodiment of the direct transfer axial TOBI 24 and self-supporting seal plate 36. The TOBI openings 26 are shown disposed through the direct transfer axial TOBI 24 and the plurality of cooling holes 38 are shown disposed through the self-supporting seal plate 36. At or near full engine power, the pressure ratio across the direct transfer axial TOBI 24 may be maximized in order to achieve high cooling flow swirl ratio (high discharge coefficient across the plurality of cooling holes 38), which reduces pressure loss across the self-supporting seal plate 36. The direct transfer axial TOBI 24 may function to impart tangential swirl 46 to the cooling air 22, such that the exit tangential velocity of cooling air 22 may closely match the rotating of the plurality of cooling holes 38 located through the self-supporting seal plate 36. To achieve tangential swirl 46, the TOBI openings 26 may be disposed in the direct transfer axial TOBI 24 at an angle inclined with respect to a central axis 20 as best illustrated in the enlarged cut away view of FIG. 6. An injected cooling air momentum vector 50 illustrates the angle at which the cooling air 22 passes through the direct transfer axial TOBI 24 and the self-supporting seal plate 36. The geometry of the openings 26 in the direct transfer axial TOBI 24 and the diameter may be set by at least three factors: the area required to pass a sufficient amount of the cooling air 22; the available supply pressure of the cooling air 22; and the coolant pressure at the exit 28 of the direct transfer axial TOBI 24. In addition, the geometry and shape of the plurality of cooling holes 38 and a thickness "T" of the self-supporting seal plate 36 are optimized to reduce radial stresses and hoop stresses. In a preferred embodiment, the geometry of the plurality of cooling holes 38 is substantially axi-symmetric in profile and elliptical in geometry to reduce hoop stresses caused by the high rotational speed of the direct transfer axial TOBI 24 and the self-supporting seal plate 36. In another preferred embodiment, the geometry of the plurality of cooling holes 38 may be described as elongated and chamfered. In addition, the thickness "T" of the self-supporting seal plate 36 is optimized to reduce radial stresses caused by the high rotational speed of the direct transfer axial TOBI 24 and the self-supporting seal plate 36.

The flow of cooling air 22 required to purge the disk cavity 31 and cool the turbine blades 44 may be supplied through the direct transfer axial TOBI 24. A pressure-drop may be sustained as cooling air 22 flow traverses through the plurality of cooling holes 38 in the self-supporting seal plate 36. The pressure drop through the plurality of cooling holes 38 may be a function of the size (i.e., cooling hole shape and diameter), a discharge coefficient, and a thickness "T" of the self-supporting seal plate 36. The discharge coefficient for flow through the plurality of cooling holes 38 may be influenced by the ratio of the tangential velocity (relative to the hole) of the cooling air 22, compared to the velocity of blade cooling air 34 through the plurality of cooling hole 38. Both of these velocities may be expressed in terms of Mach number. The tangential velocity of the cooling air 22 exiting the direct transfer axial TOBI 24, divided by the tangential velocity of the plurality of cooling holes 38, may be referred to as the "swirl ratio". A swirl ratio greater than 1.0 implies the cooling air 22 exiting the direct transfer axial TOBI 24 is "over-swirled" relative to the plurality of cooling holes 38. The relative Mach number of the cooling air 22 exiting the direct transfer axial TOBI 24, flowing tangentially in the portion of cavity 32 directly outboard of the plurality of cooling holes 38 and relative to the tangential velocity of the plurality of cooling holes 38, is referred to as the "shaft" Mach number (Mns). The Mach number of the blade cooling air 34 flowing through the plurality of cooling holes 38 may be referred to as the "hole" Mach number ($Mn_{hole}$). The parameter $Mns/Mn_{hole}$ may be used to correlate the discharge coefficient of rotation of the plurality of cooling holes 38.

It has been discovered herein that the geometry of the plurality of cooling holes 38 about the self-supporting seal plate 36 results in maximum temperature reduction with minimum pressure drop. Accordingly, in an embodiment of the present invention, the geometry of the plurality of cooling holes 38 may be formed having an elliptical shape wherein a distance between a point which is diametrically opposite another point on a boundary of each of the plurality of cooling holes 38, or pairs of points whose midpoint is at the center of each of the plurality of cooling holes 38, is maximum and minimum along two perpendicular directions, the major axis and the minor axis. In an embodiment, the plurality of cooling holes 38 may be uniform in size in that they all comprise the same elliptical geometry. In still another embodiment, the plurality of cooling holes 38 may be uniformly spaced radially about the self-supporting seal plate 36.

Accordingly, in an embodiment of the present invention, the self-supporting seal plate 36, disposed on the rotor assembly 18 of the gas turbine engine 10, may comprise the plurality of cooling holes 38 aligned and in fluid communication with the flow of cooling air 22 emanating from an exit 28 of the direct transfer axial TOBI 24, and wherein the radius of the plurality of cooling holes 38 may be aligned and in fluid communication with the radius of the lower portion 49 of each of the plurality of blade slots 42 formed within rotor assembly 18 for directing the flow of cooling air 22 to provide cooling to the plurality of turbine blades 44 of the gas turbine engine 10. The plurality of cooling holes 38 may be elliptical in shape to minimize hoop stresses and the self-supporting seal plate 36 has an optimized thickness "T" to minimize radial stresses generated by the rotational speed of the self-supporting seal plate 36 and the disk 40.

It should be understood that in a preferred embodiment, the flow of blade cooling air 34 may be adjusted to engine power levels through a combination of flow metering of the cooling air 22 in conjunction with the direct transfer axial TOBI 24, and the specific configuration of the plurality of cooling holes 38 in the rotating self-supporting seal plate 36 as best described in conjunction with a rotating cover plate disclosed in copending patent application bearing Publication No. 2006/0285968, entitled, "Turbine Rotor Cooling Flow System", published on Dec. 21, 2006, and assigned to the same assignee as here, which application is incorporated herein by reference in its entirety.

An apparatus for providing a cooling flow to a high pressure turbine rotor for small turbine engines employing a rotor seal plate that provides for maximum temperature reduction with minimum pressure drop has now been provided. In addition there is provided an apparatus for cooling turbine blades in an engine that does not adversely impact gas turbine engine efficiency, and/or does not adversely impact overall operational efficiency and cost.

While the inventive subject matter has been described with reference to a preferred embodiment, it will be understood by those skilled in the art that various changes may be made and equivalents may be substituted for elements thereof without departing from the scope of the inventive subject matter. In addition, many modifications may be made to adapt to a particular situation or material to the teachings of the inventive subject matter without departing from the essential scope thereof. Therefore, it is intended that the inventive subject matter not be limited to the particular embodiment disclosed as the best mode contemplated for carrying out this inventive subject matter, but that the inventive subject matter will include all embodiments falling within the scope of the appended claims.

We claim:

1. An apparatus, comprising:
a tangential onboard injector (TOBI) for a turbine rotor having a plurality of openings emanating a flow of cooling air;
a self-supporting seal plate having a plurality of cooling holes in fluid communication with the flow of cooling air emanating from the tangential onboard injector (TOBI); and
a rotating disk of a gas turbine engine including a plurality of turbine blade slots formed therein, wherein the self-supporting seal plate is disposed on the rotating disk,
wherein the plurality of cooling holes are in fluid communication with the plurality of turbine blade slots for directing the flow of cooling air to provide cooling to a plurality of turbine blades of the gas turbine engine;
wherein each of the plurality of cooling holes has an elliptical geometry to reduce operating hoop stresses;
wherein the plurality of openings, the plurality of cooling holes and the plurality of turbine blade slots are in axial alignment; and
wherein the plurality of cooling holes and the plurality of blade slots are in an abutting relationship.

2. The apparatus of claim 1, wherein the tangential onboard injector (TOBI) is a direct transfer axial injector system.

3. The apparatus of claim 2, wherein each of the plurality of cooling holes is sized and shaped to provide reduced operating stresses.

4. The apparatus of claim 3, wherein each of the plurality of cooling holes has a thickness optimized to reduce operating radial stresses.

5. The apparatus of claim 4, wherein each of the plurality of cooling holes is formed as an elongated, chamfered hole.

6. The apparatus of claim 3, wherein the plurality of cooling holes are uniformly spaced radially about the self-supporting seal plate.

7. The apparatus of claim 1, wherein each of the plurality of turbine blade slots is defined by an opening having an upper portion wherein a root portion of the turbine blade is inserted and a lower portion for directing the flow of cooling air to the turbine blade.

8. The apparatus of claim 7, wherein the lower portion of each of the plurality of turbine blade slots includes a radius in axial alignment with a radius of one of the plurality of cooling holes and one of the plurality of openings formed in the tangential onboard injector (TOBI).

9. The apparatus of claim 1, wherein each of the plurality of openings are disposed in the tangential onboard injector (TOBI) at an angle inclined with respect to a central axis of the apparatus.

10. An apparatus, comprising:
a direct transfer axial tangential onboard injector (TOBI) for a turbine rotor having a plurality of openings emanating a flow of cooling air;
a self-supporting seal plate including a plurality of elongated shaped cooling holes in fluid communication with the flow of cooling air emanating from the direct transfer axial tangential onboard injector (TOBI); and
a rotating disk of a gas turbine engine including a plurality of turbine blade slots formed therein, wherein the self-supporting seal plate is disposed on the rotating disk,
wherein the plurality of elongated shaped cooling holes are in fluid communication with the plurality of turbine blade slots for directing the flow of cooling air to provide cooling to a plurality of turbine blades of the gas turbine engine,
wherein the plurality of openings, the plurality of elongated shaped cooling holes and the plurality of turbine blade slots are in axial alignment;
wherein each of the plurality of elongated shaped cooling holes has a substantially elliptical geometry; and
wherein the plurality of cooling holes and the plurality of blade slots are in an abutting relationship.

11. The apparatus of claim 10, wherein the plurality of elongated shaped cooling holes are equally sized.

12. The apparatus of claim 10, wherein the plurality of elongated shaped cooling holes are uniformly spaced radially about the self-supporting seal plate.

13. The apparatus of claim 10, wherein each of the plurality of turbine blade slots is defined by an opening having an upper portion wherein a root portion of the turbine blade is inserted and a lower portion for directing the flow of cooling air to the turbine blade.

14. The apparatus of claim 13, wherein the lower portion of each of the plurality of turbine blade slots includes a radius in axial alignment with a radius of one of the plurality of elongated shaped cooling holes and one of the plurality of openings formed in the direct transfer axial tangential onboard injector (TOBI).

15. The apparatus of claim 10, wherein each of the plurality of openings are disposed in the direct transfer axial tangential onboard injector (TOBI) at an angle inclined with respect to a central axis of the apparatus.

16. A gas turbine engine comprising:
a compressor section;

a combustor section; and a turbine section, wherein the turbine section comprises:

a tangential onboard injector (TOBI) for a turbine rotor having a plurality of openings emanating a flow of cooling air;

a self-supporting seal plate having a plurality of cooling holes of elliptical geometry in fluid communication with the flow of cooling air emanating from the tangential onboard injector (TOBI); and a rotating disk including a plurality of turbine blade slots formed therein, wherein the self-supporting seal plate is disposed on the rotating disk, wherein the plurality of cooling holes are in fluid communication with the plurality of turbine blade slots for directing the flow of cooling air to provide cooling to a plurality of turbine blades of the gas turbine engine;

wherein the plurality of openings, the plurality of cooling holes and the plurality of turbine blade slots are in axial alignment; and wherein the plurality of cooling holes and the plurality of blade slots are in an abutting relationship.

17. The gas turbine engine of claim 16, wherein the cooling air is produced in a combustion plenum of the gas turbine engine.

18. The gas turbine engine of claim 17, wherein the tangential onboard injector (TOBI) is a direct transfer axial injector system.

* * * * *